United States Patent [19]

Peterson

[11] 4,428,977
[45] Jan. 31, 1984

[54] AMMONIUM SALT OF PARTIALLY EMIDIZED POLYOMIDS ACID FOR AQUEOUS COATING COMPOSITION

[75] Inventor: Marvin A. Peterson, Fort Wayne, Ind.

[73] Assignee: General Electric Company, Fort Wayne, Ind.

[21] Appl. No.: 726,247

[22] Filed: Sep. 24, 1976

Related U.S. Application Data

[63] Continuation of Ser. No. 467615, May 6, 1974, Pat. No. 4,073,788, which is a continuation of Ser. No. 822,899, May 8, 1969, abandoned.

[51] Int. Cl.$^3$ .............................. B05D 3/05; C08J 3/06; C08G 73/10; C08G 73/14
[52] U.S. Cl. .................................... 427/120; 428/458; 524/265; 524/348; 524/462; 524/588; 524/592; 524/600; 524/608; 524/708; 524/718; 524/728; 524/742; 524/743; 524/744; 524/751; 528/353; 427/388.2; 548/433; 548/477; 548/455; 548/454; 548/476; 548/431; 549/242
[58] Field of Search .................. 260/29.2 N, 78 TF; 524/600, 348; 548/433, 431, 454, 455, 476, 477; 427/120; 428/458; 549/242

[56] References Cited

U.S. PATENT DOCUMENTS

| | | | |
|---|---|---|---|
| 3,179,631 | 4/1965 | Endrey | 260/78 TF |
| 3,242,128 | 3/1966 | Chalmers | 260/78 TF |
| 3,347,808 | 10/1967 | Lavin et al. | 260/29.2 N |
| 3,377,310 | 4/1968 | Serlin et al. | 260/78 TF |
| 3,440,197 | 4/1969 | Boldebuck et al. | 260/29.2 N |
| 3,448,068 | 6/1969 | Holub et al. | 260/78 TF |
| 3,507,765 | 4/1970 | Holub et al. | 260/29.2 N |
| 3,511,807 | 5/1970 | Lovejoy | 260/78 TF |
| 3,518,219 | 6/1970 | Lavin et al. | 260/29.2 N |
| 3,528,937 | 9/1970 | Reynolds et al. | 260/29.2 N |
| 3,573,132 | 3/1971 | Ducloux et al. | 260/29.2 N |
| 3,663,728 | 5/1972 | Hoback et al. | 260/29.2 N |
| 3,703,493 | 11/1972 | Holub | 260/29.2 N |
| 3,804,793 | 4/1974 | McQuade | 260/29.2 M |
| 3,810,858 | 5/1974 | Boldebuck | 260/29.2 N |
| 4,073,788 | 2/1978 | Peterson . | |

FOREIGN PATENT DOCUMENTS

| | | | |
|---|---|---|---|
| 672175 | 5/1966 | Belgium | 260/29.2 N |
| 953845 | 8/1974 | Canada . | |
| 41-15417 | 8/1966 | Japan | 260/326 C |

*Primary Examiner*—John C. Bleutge
*Assistant Examiner*—Arthur H. Koeckert
*Attorney, Agent, or Firm*—Joseph E. Papin

[57] ABSTRACT

A water soluble composition including an amine or ammonium salt of a polyimide precursor which is obtained by the reaction steps of: reacting a tetracarboxylic compound and a diamine in about equimolar amounts in a water miscible organic solvent to obtain the polyimide precursor; and reacting the polyimide precursor with ammonia, or an aqueous solution of ammonia, or a primary or secondary aliphatic amine in an amount sufficient to neutralize the free carboxyl groups of the polyimide precursor.

A process of coating and a substrate are also disclosed.

35 Claims, 3 Drawing Figures

FIG.1 (MBM - ROUTE)

FIG.2 (BMB - ROUTE)

FIG.3 (MBM-BMB ROUTE)

AMMONIUM SALT OF PARTIALLY IMIDIZED POLYAMIDE ACID FOR AQUEOUS COATING COMPOSITION

CROSS-REFERENCE TO RELATED APPLICATIONS

This application is a continuation of copending application Ser. No. 467,615 filed May 6, 1974 now U.S. Pat. No. 4,073,788, issued Feb. 14, 1978, which in turn was copending with and a continuation of application Ser. No. 822,899 filed May 8, 1969 (now abandoned), and the contents of both of these earlier applications are specifically incorporated by reference herein.

FIELD OF THE INVENTION

This invention relates generally to chemical compositions and in particular to a water soluble composition, a process of coating a substrate, and a substrate.

BACKGROUND OF THE INVENTION

The advantages of synthesizing insulation coatings for magnet wire from aromatic dianhydride and aromatic diamine materials are known in the prior art. The techniques for such synthesis, however, have not always yielded consistent reaction product materials. Moreover, the starting materials comprised of the aromatic dianhydrides and aromatic diamines, as well as the polyamic acid produced therefrom are apt to be difficult to store and require solvent materials which are expensive and generally are dangerous pollutants which must be disposed of during the coating process. Until recently, the polymeric materials exhibited such water sensitivity that they were considered to be generally nonstorable for any significant period of time. One solution now available for that particular problem is disclosed in my copending application titled, "Improved Process for Producing Coating Materials," U.S. application Ser. No. 803,037, filed Feb. 27, 1969, (now abandoned) and invented by Marvin A. Peterson, which is assigned to the same assignee as the present invention.

It is known, that for magnet wire insulation purposes, or surface coatings in general, superior coatings are obtained by utilizing the highest possible molecular weight of polymer and by utilizing polymers which are characterized by consistent and uniform molecular weights. When low molecular weight entities are present, they are generally lost during the cure.

A further technical problem which has proved difficult to solve, entails the necessity for obtaining a preferred viscosity and solids/solvent ratio of the coating material solution at the time it is applied to the magnet wire. These parameters of wire coating operation have proven difficult to control and even more difficult to optimize for a given wire coating operation in order to achieve both ideal coating rate of application and a superior enamel insulation in the finished product. Presently known coating compositions cannot be generally relied upon to provide consistently the functional and compositional requirements for wire coating operation as well as a satisfactory insulation coating.

SUMMARY OF THE INVENTION

Among the several objects of the present invention may be noted the provision of a water soluble composition, a process of coating a substrate with such composition, and a substrate coated with such composition which overcome the disadvantageous or undesirable features discussed above, as well as others, with respect to the prior art; the provision of such composition, process and substrate embodying a polyimide precursor which finds particular but not exclusive utility in the formation of a polyimide enamel insulation coating on magnet wire; the provision of such composition which upon curing produces a polyimide polymer; the provision of such composition, process and substrate embodying an amidization reaction product of a polycarboxylic compound and wherein such composition can be more readily imidized to a preferred amount thereby to facilitate more precise control of such composition; the provision of such composition, process and substrate embodying a uniform polymer molecular weight in the finished polyimide with the molecular weight of the polymer falling within a narrow range of relatively high molecular weight numbers; and the provision of such composition and process which produces a coating for such substrate of uniform high quality which does not vary substantially either during the coating process or from one coating process to the next. These, as well as other objects and features of the present invention, will be in part apparent and in part pointed out hereinafter.

In general, a water soluble composition in one form of the invention comprises an amine or ammonium salt of a polyimide precursor which is obtained by the reaction steps of: reacting a tetracarboxylic compound amidizable to an orthoamic acid, and a diamine in about equimolar amounts in a water miscible organic solvent to obtain a polyimide precursor; and thereafter reacting the polyimide precursor with ammonia, or an aqueous solution of ammonia, or a primary or secondary aliphatic amine in an amount sufficient to neutralize the free carboxyl groups of the polyimide precursor.

Also in general and in one form of the invention, a process is provided for coating a substrate. In this process, the water soluble composition, as discussed in the preceding paragraph, is applied to the substrate, and the coated substrate is then heated so as to cure the coating to the polyimide polymer form.

Further in general, a substrate in one form of the invention has a cured coating of the water soluble composition set out above.

DESCRIPTION OF THE INVENTION

In accordance with the present invention, a tetracarboxylic compound amidizable to an orthoamic acid, such as an aromatic dianhydride, and an aromatic diamine are combined in a suitable solvent and reacted in the molar ratio of approximately two-to-one to form an intermediate or precursor material which is either a diorthoamic acid dianhydride or a diorthoamic acid diamine, which diorthoamic acid compound is subsequently imidizable. The aromatic dianhydride reactant is generally of the formula wherein R is a tetravalent radical containing at least one ring of six carbon atoms and having benzenoid unsaturation, the four carbonyl groups being attached to different adjacent carbon atoms, while the aromatic diamine is of the formula $H_2N—R'—NH_2$, wherein R' is a divalent aromatic radical. The intermediate reaction product thus formed is further polymerized or "zipped-up" by reaction with a further amount of the reactant, or its equivalent, in the lesser molar amount to produce a polyimide prepolymer consisting or recurring units of the formula:

wherein R and R' have the above identified meanings, the arrows indicate isomerism, and n is an integer of 10 to 1000.

Before final polymerization, the intermediate can be partially imidized through intramolecular reaction by controllably heating the intermediate at approximately 90 degrees centigrade thereby forming stable partially imidized units which upon "zipping up" or polymerization form the following:

wherein the components are as identified above.

AROMATIC DIANHYDRIDE REACTANT

The aromatic dianhydrides that are useful in the process of this invention are those having the formula wherein R is a tetravalent radical containing at least one ring of 6 carbon atoms and having benzenoid unsaturation, each pair of carboxyl groups being attached to different adjacent carbon atoms. These dianhydrides include, for example, pyromellitic dianhydride (PMDA); 2,3,6,7-naphthalenetetracarboxylic dianhydride; 3,3'4,4'-benzophenonetetracarboxylic dianhydride (BPDA) benzene-1,2,3,4-tetracarboxylic dianhydride; bis(3,4-dicarboxylphenyl) sulfone dianhydride; bis(3,4-dicarboxyphenyl) methane dianhydride; bis(2,3-dicarboxyphenyl)methane dianhydride; 2,6-dichloronaphthalene-1,4,5,8-tetracarboxylic dianhydride; 2,7-dichloronaphthalene,4,5,8-tetracarboxylic dianhydride; 2,3,6,7,-tetrachloronaphthalene-1,4,5,8-tetracarboxylic dianhydride; naphthalene-1,4,5,8-tetracarboxylic dianhydride; naphthalene-1,2,4,5-tetracarboxylic dianhydride; 3,3',4,4'-diphenyltetracarboxylic dianhydride; 1,2,5,6-naphthalenetetracarboxylic dianhydride; 2,2',3,3'-diphenyltetracarboxylic dianhydride; 2,2-bis(3,4-dicarboxyphenyl) propane dianhydride; 3,4,9,10-phenylenetetracarboxylic dianhydride; bis(3,4-dicarboxyphenyl) ether dianhydride; 2,2-bis(2,3-dicarboxyphenyl)propane dianhydride; 1,1-bis(2,3-dicarboxyphenyl) ethane dianhydride, 1,1-bis(3,4-dicarboxyphenyl)ethane dianhydride; and the like.

ORGANIC DIAMINE REACTANT

The organic diamines that are useful in the process are those having the formula $H_2N—R'—NH_2$ wherein R' is a divalent radical selected from the class consisting of wherein R''' and R'''' are an alkyl or an aryl group having 1 to 6 carbon atoms, n is an integer of from 1 to 4, and m has a value of 0, 1 or more, and wherein R″ is selected from the group consisting of an alkylene chain having 1-3 carbon atoms, wherein R‴ and R″″ are as above-defined and x is an integer of at least 0.

Specific diamines which are suitable for use in the present invention are: meta-phenylene diamine (mPDA); para-phenylene diamine (mPDA); 4,4′-diamino-diphenyl propane; 4,4′-diamino-diphenyl methane; benzidine; 4,4′-diaminodiphenyl sulfide; 4,4′-diamino-diphenyl sulfone; 3,3′-diamino-diphenyl sulfone; 4,4′-diamino-diphenyl ether; 2,6-diamino-tyridine; bis-(4-amino-phenyl) diethyl silane; bis-(4-amino-phenyl)phosphine oxide; bis-(4-amino-phenyl)-N-methylamine; 1,5-diamino naphthalene; 3,3′-dimethyl-4,4-diamino-biphenyl-3,3′dimethoxy benzidine; m-xylylene diamine; p-xylylene diamine; 1,3-bis-delta-aminobutyltetramethyl disiloxane (ABTS); 1,3-bis-gamma-aminopropyltetraphenyl disiloxane; and mixtures thereof.

SOLVENT

The solvents useful in the solution phase of this invention are the organic solvents whose functional groups do not react with either of the reactants (the diamines or the dianhydrides) to any appreciable extent. Besides being inert to the system and preferably, being a solvent for the polyamide acid, the organic solvent must be a solvent for at least one of the reactants, and preferably for both of the reactants. The organic solvent is an organic liquid other than either reactant or homologs of the reactants, that is a solvent for at least one reactant, and contains functional groups, the functional groups being groups other than monofunctional primary and secondary amino groups and other than the monofunctional dicarboxylanhydro groups. Such solvents include dimethylsulfoxide; N-methyl-2-pyrrolidone (NMP); the normally liquid organic solvents of the N, N-dimethylmethoxyacetamide; N-methylcaprolactam; and like solvents. Also, tetramethylene urea; pyridine; dimethylsulfone; hexamethylphosphoramide; tetramethylene-sulfone; formamide; N-methylformamide, butyrolactone; or N-acetyl-2-pyrrolidone. The solvents can be used alone, as mixtures, or in combination with poor solvents such as benzene, toluene, cresylic acid, xylene, dioxane, cyclohexane, or benzonitrile.

It is important in the process of this invention that the reactants and the solvents be essentially anhydrous during the initial condensation reaction in order to prevent hydrolysis of the dianhydride to its acid form which acts as an impurity and lowers the molecular weight.

The present invention is not restricted to the use of a particular aromatic anhydride or a particular aromatic diamine. For convenience in illustration, however, specific reference may be made to the reaction of 3,3′,4,4′ benzophenone tetracarboxylic dianhydride, which is abbreviated "BPDA" or sometimes just "B", and 4,4′ methylenedianiline which is abbreviated "MDA" or sometimes just "M". These reactants may be reacted together, following the teachings of the invention, to form a polyamic acid polymer, having a desired molecular weight, purity and degree of imidization, in a coating solution of a desired viscosity.

To illustrate the present invention, an aromatic anhydride and aromatic amine are reacted together in approximately the molar ratio of two-to-one (2/1). For example, two moles of the aromatic anhydride, 3,3′ 4,4,′, -benzophenonetetracarboxylic dianhydride (B) having the formula are reacted with one mole of the aromatic diamine 4-4′-methylenedianiline (M) having the formula in N-methyl-2-pyrrolidone solvent to produce a reaction product having the formula

This material, a "precursor prepolymeric material", is known as a dianhydride diacid diamide, and may be expressed by the shorthand formula "BMB." The precursor prepolymeric material is a stable compound, is storable and can be readily further reacted, as will be described, to form a high molecular weight polyorthoamic acid. Additionally, the material can, if desired, be heated controllably to effect a desired degree of imidization. When such BMB is partially imidized, there is an intramolecular reaction which occurs between the acid poriton of the BMB molecule and the hydrogen atom of the amide to produce the following molecule (assuming a 50 percent imidization):

This molecular structure is known as a dianhydride imide acid amide.

I can also produce prepolymeric materials utilizing two moles of M for each mole of B.

The product produced would be represented by the formula which, for convenience may be abbreviated as "MBM." The foregoing product is known as a diamine diacid diamide.

I generally prefer to form the precursor in the form of BMB because the B is obtainable in powder form and is hydrolyzable so that it is preferred to solubilize or slurry the B under inert atmosphere in a suitable solvent, such as N-methyl-2-pyrrolidone or dimethylsulfoxide, these being only two examples of acceptable solvents. The M is a granular product which is more easily added to the reaction without protection than is the B. I further found, that in solutions of MBM, there tends to form a ketimine wherein the M reacts with a carbonyl of the B to produce the following reaction product:

12% imidized

The formation of ketimine may or may not be desirable, and it can be minimized in the BMB route.

Exhaustive testing of flexibility, toughness, dielectric strength, concentricity, heat resistance, abrasion resistance, cut through and the like are related to the ability to form high molecular weight polyimide enamels having a narrow range of molecular weights. One of the substantial advantages of the present invention is that I can achieve just those results in the finished product, by slowly adding M to BMB precursor prepolymeric material solution or by adding B to an MBM solution, these reactions being represented by:

$$nBMB + nM \rightarrow \text{\{}BMBM\text{\}}_n \quad (1)$$

$$nMBM + nB \rightarrow \text{\{}MBMB\text{\}}_n \quad (2)$$

The resulting polymer made in acordance with the described procedure is of higher molecular weight than heretofore obtainable and tends to have a narrow molecular weight distribution in accordance with the values indicated in Table 1.

TABLE 1

Molecular weight and polydispersity of polyimide prepolymers in accordance with the present invention as determined by gel permeation chromatography:

| Sample No. | Description of Polymer System | $\eta$ inh (dl./gm.) | $\overline{A}_n$ (Angstroms) | $\overline{A}_w$ (Angstroms) | MWD |
|---|---|---|---|---|---|
| 1 | BMB made to M/BMB = 1.016/1.000 | 0.60 | 18,596 | 47,815 | 2.6 |
| 2 | Sample No. 1 + NH$_3$ + H$_2$O, pH = 6.7 | — | 26,518 | 51,277 | 1.9 |
| 3 | Sample No. 1 | — | 20,672 | 39,867 | 1.9 | where $\eta_{inh}$ is the inherent viscosity in dl./gm. evaluated in N-methyl-2-pyrrolidone at 37.8° C.

$\overline{A}_n$ and $\overline{A}_w$ are number average and weight average molecular weights, respectively, expressed in terms of chain length in Angstroms, and $$MWD = \frac{\overline{A}_w}{\overline{A}_n}$$

= measure of the polydispersity of the system. I believe that these features are the result of the greater mobility of the structural BMB molecules in the solution as compared with higher molecular weight precursor polyamic acid materials. Further, when the M is added (slowly) to the BMB solution, the reaction is exothermic; but the heating is controlled by means of a jacketed reaction vessel, and the agitators can also be cooled if desired. Thus I have substantiated from actual testing of molecular weights of the BMB synthesis route that an average molecular weight of polyorthoamic acid is attainable in the chain length range of 2 to $20 \times 10^4$ Angstroms and the relatively narrow distribution of molecular weight or polydispersity range of 1.9 to 5.7.

Figure 1:
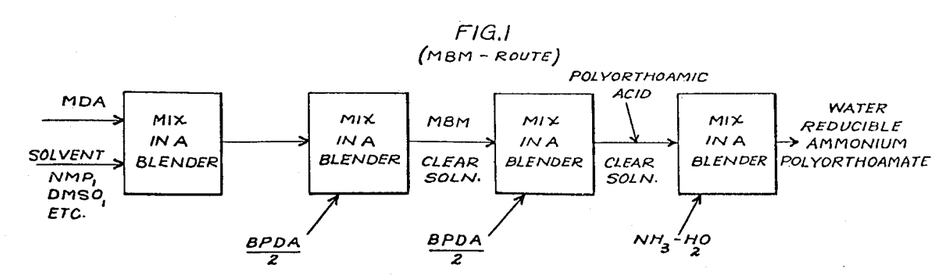
FIG. 1 is a schematic flow diagram illustrating one process embodying the present invention.
Figure 2:
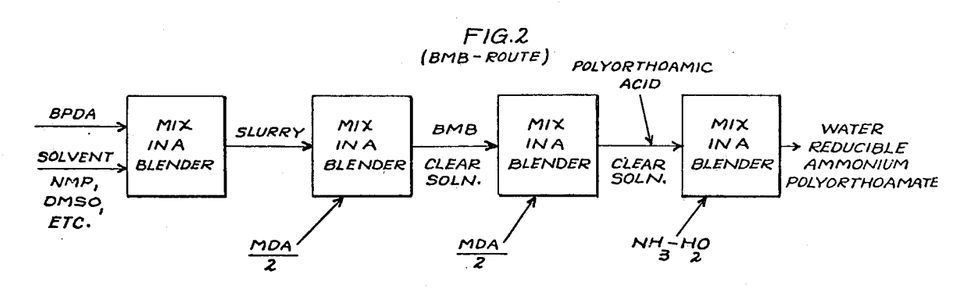
FIG. 2 is a schematic flow diagram illustrating an alternative process embodying the present invention.
Figure 3:
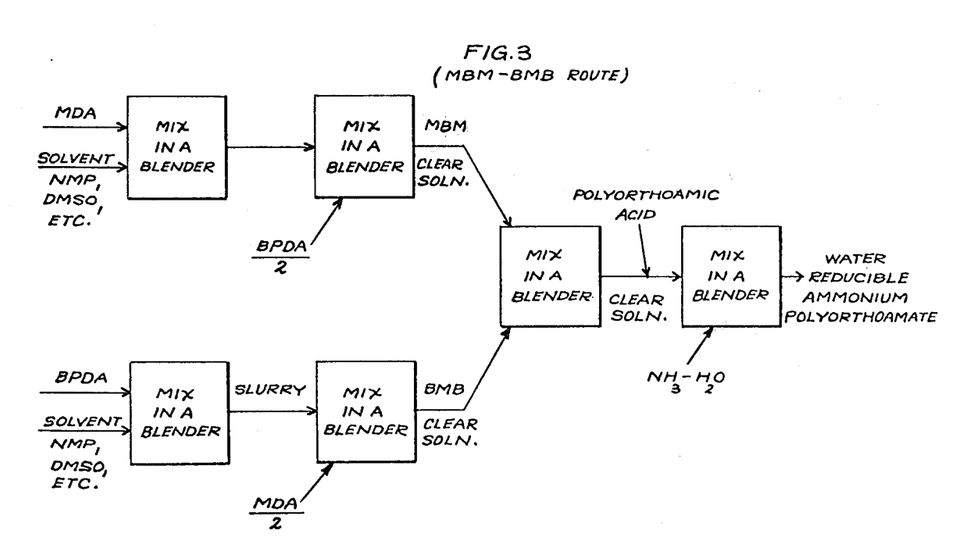
FIG. 3 is a schematic flow diagram illustrating still a further alternative process embodying the present invention.

In the process of producing the prepolymeric material MBM, polyimide prepolymers can be prepared having up to 70 percent by weight solids/solvent ratio. There are no limits to the solids level of the preparation except that the apparatus used for effecting the mixing of the materials tends to become prohibitively expensive and impractical. Referring to the drawings, in FIG. 1 the ammonium polyorthoamate polyimide prepolymer is prepared by first mixing MDA in its solvent NMP or the like. One-half of the BPDA is then added to form MBM, a precursor material, and the final molecular weight and polydispersity of the prepolymer is achieved by adding the remaining BPDA, either as a powder or in solution form, to yield a high solids level polyorthoamic acid. The polyorthoamic acid is next treated with ammonia to produce ammonium polyorthoamate, a stable water reducible prepolymeric material. During these stages the times, concentrations and temperatures are regulated to achieve the viscosity, molecular weight, and concentrations (solids/solvent ratio) appropriate to the coating. Such parameters as time, temperature and concentration are disclosed in the examples set forth below. In FIG. 2, the order of addition of BPDA and MDA are reversed and the MDA is added in half-portions at separate steps.

I have prepared the polyamide prepolymer at solids levels in excess of 70% using a mortar and pestle, and then reacted the prepolymer with ammonia. I have found that in a GE household blender, for example, the practical solids level is 35-37%; above this level the blender motor will burn out due to the high viscosity of the solution. In addition, in a 3"×5" 3-roll mill the practical solids level is 37-40%; in a production type 3-roll mill size 5"×12", it is 45-50%. The latter solids level can likewise be handled in certain vertical mixers, e.g., the Regal mixer manufactured by J. H. Day Co. The solids level may be further increased to the range of 70% by the use of movable arm mixers when this order of concentration of reactants is desired.

The temperature at which the initial condensation reaction of the dianhydride and the diamine is carried out is preferably below 80° C. in order to obtain negligible imidization of the polymer, a level subsequently stabilized by the addition of the nitrogen containing base. The particular temperature below 80° C. that must not be exceeded for any particular combination of diamine, dianhydride, solvent and reaction time to provide an essentially 100 percent polyamic acid polymer will vary but can be determined by a simple test by any person of ordinary skill in the art. However, for most purposes it has been found that temperature should be maintained preferably below 50° C.

The molar ratio of the reactants, i.e., the dianhydride and diamine, starts out in the ratio of 1/0.5 with the remainder being added to a ratio 1/1. Deviation from the 1 to 1 molar ratio should not be greater than 1.05 to 1, to 1 to 1.05 if polyimide prepolymers which will form good polyimide films are to be obtained. It is preferred to employ the diamine in a slight excess in order to obtain a polymer terminated with —NH$_2$ groups rather than an anhydride group which could hydrolyze to an acid group. Where the polymer is terminated with —NH$_2$ groups, the resulting polyamide film has good metal adhering qualities and excellent dielectric properties. Where the polyamide prepolymer has acid groups at either or both ends of the chain, the film reacts with the metal upon which it is coated and the electrical insulating properties are rather poor.

In many instances, it is desired to control the viscosity of the coating material at a preferred weight/solvent ratio. The ideal coating solution in most instances is one of approximately 17 percent solids and a viscosity of approximately 2500 cps. This can be accomplished by controllably imidizing the BMB dianhydride-diacid-diamide to an amide-imide-acid-dianhydride through heating of the material from 90 to 110 degrees centigrade until a preferred percent of imidization has taken place as determined by a titration procedure for residual carboxylic acid. The partially imidized dianhydride-imide-acid-amide may then be blended with an additional amount of non-imidized BMB to obtain the preferred viscosity at the desired concentration of prepolyimide coating material. There is the relationship between the precursor imidization and viscosity in accordance with the following Table II:

TABLE II

| Imidization (%) | Solids (%) | Viscosity @ 23 C. (cps) |
|---|---|---|
| 0-2 | 38.3 | 36,650 |
| 14-15 | 37.8 | 1,200 |
| 29-30 | 39.2 | 610 |
| 54-56 | 42.8 | 445 |

The controlled imidization described does not affect the molecular weight of the product and heating can be safely undertaken without depolymerization, which occurred when heating efforts were made to effect imidization of polyorthoamic prepolymer materials of greater molecular length than the BMB precursors. The imidized or partially imidized MBM or BMB materials ranging up to 55 percent imidization are soluble in the mother liquor and are convertible to the ammonium form and are thereafter dilutable with water for the final coating operation.

In place of adding MDA or BPDA a modifying material such as is shown in Table III may be added in the indicated mole percent.

TABLE III

| Modified portion | Modifying material | Mole (%) | Mode of syn. |
|---|---|---|---|
| MDA | ODA | 3 | BMB |
| MDA | ODA | 10 | BMB |
| MDA | mPDA | 3 | BMB |
| MDA | mPDA | 10 | BMB |
| MDA | TTA | 3 | BMB |
| MDA | TTA | 10 | BMB |
| MDA | DDS | 3 | BMB |
| MDA | DDS | 10 | BMB |
| MDA | ABTS | 3 | BMB |
| MDA | ABTS | 10 | BMB |
| BPDA | PMDA | 3 | MBM |
| BPDA | PMDA | 10 | MBM |
| BPDA | CPDA | 3 | MBM |
| BPDA | CPDA | 10 | MBM |
| MDA | ODA | 3 | BMB |
| MDA | ODA | 10 | BMB |
| MDA | mPDA | 3 | BMB |
| MDA | mPDA | 10 | BMB |

TABLE III-continued

| Modified portion | Modifying material | Mole (%) | Mode of syn. |
|---|---|---|---|
| MDA | TTA | 3 | BMB |
| MDA | TTA | 10 | BMB* |
| MDA | DDS | 3 | BMB |
| MDA | DDS | 10 | BMB |
| MDA | ABTS | 3 | BMB |
| MDA | ABTS | 10 | BMB |
| BPDA | PMDA | 3 | MBM |
| BPDA | PMDA | 10 | MBM |
| BPDA | CPDA | 3 | MBM |
| BPDA | CPDA | 10 | MBM |

*Though a clear polymer solution was formed at the 3 mole % level, crystals, presumably of TTA, appeared on standing in the 10 mole % level indicating an upper level between 3 and 10%.

From table III it can be seen that modification and mole percent may range considerably together with the percent of imidization to control the final coating properties. The workable concentration by weight of raw material solids in an organic solvent is approximately 45 percent on a 5"×12" three roll mill and approaches 50 percent in the "one gallon" Regal mixer if the reaction temperature is controlled at about 25 degrees centigrade.

It is sometimes advantageous to blend with the MBM controlled amounts of other linear difunctional amines and anhydrides such as the reaction product of pyromellitic dianhydride sometimes referred to as "PMDA" or "P" having the structure and 4,4'-oxydianyline, sometimes referred to as "ODA" or "O" having the molecular structure which, when combined together in the molar ratio of two moles PMDA plus one mole ODA provides:

which precursor polymeric material may be identified as "POP." Thus, it is possible to combine BMB and POP precursors which can then be linked together by the addition of either M or O, or mixtures of both, to yield preferred percentages of each prepolymeric unit. I can also substitute replacement aromatic dianhydride atoms for the BPDA or replacement aromatic diamines for the MDA. Examples of such substitutions are: 2,4,6-triamino-1,3,5-triazine (TTA) having the formula which can substitute for the M in the BMB precursor. For example:

wherein R' is representative of the diamine and may be as defined above, and the dianhydride may be partially substituted in accord with the following:

wherein R is as above defined. Since the degree of polymerization is well above 10, it is possible to have virtually all macromolecules of the 10% level of substitution with at least one MDA or BPDA replaced. It should be understood that only slight changes in structure can suffice to disturb the packing of polymer chains when the solvent is removed to effect a change in physical and functional properties.

Other aromatic diamines which may be substituted include 4,4'-sulfonyldianiline (DDS) having the formula Other dianhydrides include 1,2,3,4-cyclopentane-tetracarboxylic dianhydride (CPDA) having the formula The relatively higher inherent viscosities for polymers modified with TTA and PMDA both highest at the 3 percent versus the 10 percent level, is explainable on the basis of some cross-linking ability of TTA and linking ability of PMDA, the latter being inflexible relative to BPDA. By controlling both imidization and substitution, the higher solids coating composition at acceptable viscosity levels are attainable thus requiring a fewer number of passes for a given degree of coating on the surface of the magnet wire; and, since less solvent is required, there is a consequent reduced solvent loss which is an important factor of economy. The very fact that I can introduce parameters which can control the degree of viscosity is itself a valuable fabricating tool.

The relationship of imidization and substitution to kinematic viscosity is summarized in Table IV for the BPDA-MDA polymer:

TABLE IV

| Modified Portion | Modifying Material | Mole (%) | Imid (%) | Viscosity (Cps) | Solids (%) |
| --- | --- | --- | --- | --- | --- |
| none | none | — | 7.86 | 16,280 | 30.8 |
| MDA | ODA | 3 | 7.45 | 12,600 | 30.4 |
| MDA | ODA | 3 | 20.0 | 16,500 | 30.4 |
| MDA | ODA | 10 | 6.85 | 17,950 | 30.6 |
| MDA | ODA | 10 | 19.0 | 20,000 | 30.6 |
| MDA | TTA | 3 | 0.63 | 31,300 | 28.6 |
| MDA | TTA | 3 | 15.4 | 45,500 | 28.6 |
| MDA | TTA | 10 | 12.2 | 5,670 | 27.8 |
| BPDA | PMDA | 3 | 7.52 | 28,120 | 25.6 |
| BPDA | PMDA | 10 | 8.61 | 10,680 | 25.0 |
| BPDA | CPDA | 3 | 8.55 | 9,450 | 25.4 |
| BPDA | CPDA | 10 | 10.8 | 1,600 | 25.3 |

It will be noted from Table IV that a wide viscosity range is possible at a given solids level by substitution and imidization.

The degree of imidization is determined by titrating for a determination of the number of carboxyl groups; any acceptable titration technique is acceptable, but that which I generally utilize is titration of the carboxylic acid groups in pyridine with t-butyl ammonium hydroxide in methanol to a thymol blue end point.

Once a particular viscosity and molecular weight for the prepolyimide are optimized, the polyamide prepolymer is treated with a volatile base ammonium hydroxide to convert the prepolymer to the ammonium salt of the polyorthoamic acid to form recurrent units having the formula:

In this form the polyimide prepolymer is water soluble so that a substantial portion of the organic solvent can be replaced by water. For further details of this step reference may be made to my above-identified copending application Ser. No. 803,037 for "Improved Process for Producing Coating Materials". The water base coating solution is then applied to a substrate such as an electrically conductive wire, and the polyamide acid coating is converted to a polyimide coating on the base structure by heating to a temperature of from 100 degrees centigrade to 500 degrees centigrade, to produce a finished polyimide polymer having recurring units of the formula In order that those skilled in the art may better understand how the invention may be practiced, the following examples are given by way of illustration and not by way of limitation. All parts are parts by weight unless otherwise expressly set forth.

EXAMPLE 1

A J. H. Day Co. Regal, vertical high-rate-of shear mixer was flushed with dry nitrogen, dewpoint −65° C. To the mixer was charged 1738 gm. of dry N-methyl-2-pyrrolidone (<0.01% water), followed by 579.6 gm. (1.800 moles) of purified 3,3'4,4'-benzophenonetetracarboxylic dianhydride, (B), (>99.5% purity). This was stirred for about one minute. Then, 178.5 gm. (0.900 mole) of p,p'-methylene dianiline, (M), (>99.7% purity) was added and the stirring continued for several minutes forming a "BMB" precursor. Cooling water was flushed through the mixer to maintain a 35° C. maximum exotherm temperature and to return the temperature of the precursor system to 25° C. Finally, 182.0 gm. (0.918 mole) of p,p'-methylene dianiline, (>99.7% purity) was added and mixing continued for one hour with the exotherm again controlled at a maximum of 35° C. and the polymer system eventually maintained at 25° C. After the polymer was formed, 220 gm. of 28% ammonium hydroxide was added to the Regal mixer while maintaining further mixing. After a few minutes 2000 gm. of distilled water was added and the system stirred for about one hour. The system has a viscosity of 640 cps. It had a solids level of 20.4% as the ammonium polyorthoamate and a solids level of 17.9% when fully cured to the polyimide. This material was employed in the form of the ammonium polyorthoamate to coat copper and aluminum wire and cured to the polyimide form with laboratory simulated wire tower procedure. It was found on curing to pass 1 and 2X @ 25% elongation at a 6-pass film build of about 3.0 mil on the diameter.

EXAMPLE 2

The polymer produced according to Example 1 was mixed with a "flow agent-surfactant" in the following manner: 0.7% by total system weight of a conventional nonionic, nonylphenolethylene oxide adduct was incorporated, and the formulated material employed as an enamel to coat copper and aluminum wire in a conventional wire enameling tower. The coating was found to pass 25% elongation and 1-2X flexibility.

EXAMPLE 3

The polymer system of Example 1 was mixed with a cresylic acid-phenol blend and n-butyl alcohol in the following manner: a mixture of these two ingredients was added to the polymer system of Example 1 in an amount such that each was present to the extent of 6% by weight of the total system. The formulated material was employed as an enamel to coat copper and aluminum wire in a conventional wire enameling tower. The coating was found to pass 25% elongation and 1-2X flexibility. Burnout test data, obtained as described below, for this enamel on copper is shown in Table V in comparison with wire from commercially available polyimide enamels (DuPont Type I and Type II ML) and polyamide-imide (AMOCO AI235).

TABLE V

Twisted Pair Burnout Test to Compare Three Kinds of Magnet Wire Enamel

| Enamel* | Sample | Time to Failure |
|---|---|---|
| I | 1 | 20 Seconds |
| I | 2 | 18 Seconds |
| I | 3 | 21 Seconds |
| I | 4 | 18 Seconds |
| I | 5 | 20 Seconds |
| II | 1 | 480 Seconds** |
| II | 2 | 480 Seconds** |
| III | 1 | 480 Seconds** |
| III | 2 | 480 Seconds** |
| IV | 1 | 480 Seconds** |
| IV | 2 | 480 Seconds** |

**Failure had not occurred up to this point.
*Enamels are:
I. AMOCO AI-235, polyamide-imide
II. DuPont Type I ML, polyimide
III. DuPont Type II ML, polyimide
IV. Polyimide prepared according to Example 3.

The test set-up for the burnout test was devised similar to the set-up described by H. L. Emmons in the magazine INSULATION, September 1967. A special low-voltage, high-current transformer with two identical secondaries was available. Each secondary can supply 2 volts at 1000 amperes. The output voltage is controllable by an induction regulator. A separate transformer and variable-voltage transformer were used to apply 500 volts between the twisted wires. A sensitive circuit breaker, rated at 0.75 amperes, was connected in the primary of the high potential transformer. A plastic cover was used to protect the sample from air current. To conduct a test, first the 500 volts was applied then the high-current transformer was turned on pre-set to about 55 amperes in each wire. The current decreased as the wires heated. The short-term failures occurred at about 40 amperes. The current stabilized at about 35 amperes in the long-term tests.

EXAMPLE 4

The polymer system of Example 1 was mixed with a flow agent in the following manner: 100 ppm of a carboxypropyl terminated dimethyl siloxane polymer (DP=10) was incorporated and the formulated material employed as an enamel to coat copper and aluminum wire in a conventional wire enameling tower. The coating was found to pass 25% elongation and 1-2X flexibility.

EXAMPLE 5

The polymer system of Example 1 was mixed with a "surfactant-flow agent" in the following manner: 100 ppm of a fluorocarbon surfactant was incorporated and the formulated material employed as an enamel to coat copper and aluminum wire in a conventional wire enameling tower. The coating was found to pass 25% elongation and 1-2X flexibility.

EXAMPLE 6

A polymer was prepared with the equipment described in Example 1, but by charging 1.01 moles of M to a solution of one mole of B. The polyamide polymer thus formed when applied to a copper wire and cured to the polyimide, did not pass the flexibility test, e.g., passed only 25% elongation and 4-5X flexibility.

EXAMPLE 7

A polymer prepared as described in Example 6 in a phenol-cresol solvent system, and with carboxyl propyl terminated dimethyl siloxane added as described in Example 4, did not have flexibility as above, i.e., it had only 25% elongation and 5X-6X flexibility on copper and aluminum wire coated in the conventional wire enameling tower.

EXAMPLE 8

246 gm. of NMP was charged to a reaction kettle equipped with agitation, nitrogen inlet and outlet, a thermometer, provision for controlled heating, and provision for withdrawal of water of condensation. To this was charged 33.4 gm (0.103 moles) of BPDA (B) with stirring. After a period of several minutes 10.3 gm. (0.052 moles) of MDA (M) was added over a period of 5 minutes with stirring. After another period of several minutes the clear solution of BMB was raised in temperature to 98° C. and maintained for a period of 40 min. during which water of condensation was removed. The material, partially imidized BMB, was titrated for carboxylic acid and the percent imidization found to be 18.4%. After cooling to 23° C., an additional 10.5 gm. (0.053 moles) of MDA was added slowly to the contents of the reactor with stirring and the temperature maintained at less than 40° C. There was no observed water of condensation. The material was titrated for carboxylic acid and the percent imidization found to be 9.2%. A 100 gm. sample of the product at about 18% solids was removed from the reaction kettle and treated with 5.0 ml. of conc. ammonia water. The resultant poly (ammonium orthoamate-imide) polymer solution could be reduced with water to any solids level, yielding a clear solution.

EXAMPLE 9

246 gm. of NMP was charged to a reaction kettle equipped with agitation, nitrogen inlet and outlet, a thermometer, provision for controlled heating, and provision for withdrawal of water of condensation. To this was charged 33.4 gm. (0.103 moles) of BPDA (B) with stirring. After a period of several minutes 10.3 gm. (0.052 moles) of MDA (M) was added over a period of 5 minutes with stirring. After another period of several minutes the clear solution of BMB was raised in temperature to 95° C. and maintained for a period of 10 min. during which water of condensation was removed. The material, partially imidized BMB, was titrated for carboxylic acid and the percent imidization found to be 24.2%. After cooling to 23° C., an additional 10.5 gm. of MDA were added slowly to the contents of the reactor with stirring and the temperature maintained at less than 40° C. There was no observed water of condensation. The material was titrated for carboxylic acid and the percent imidization found to be 12.1%. The polyorthoamic acid-imide was analyzed for molecular weight with gel permeation chromatography, and the results are presented as Sample No. 3, in Table I. A 100 gm. sample of the product at about 18% solids was removed from the reaction kettle and treated with 5.0 ml. of conc. ammonia water. The resultant poly (ammonium orthoamate-imide) polymer solution could be reduced with water to any solids level, yielding clear solutions.

EXAMPLE 10

3000 gm. of NMP was charged to a Waring Blender under nitrogen. To this was added 541 gm. (1.680 moles) of BPDA. The blender was run for 25 sec. Then 166.3 gm. (0.840 moles) of MDA was added over a period of 15 sec. with stirring. After a period of several minutes, a second charge of 166.3 gm. (0.840 moles) of MDA was added over a period of two minutes with stirring. The resultant clear solution had a viscosity of 8300 cps. (at 23° C.) at 22.4% solids. On dilution to 19.0% solids with NMP the viscosity was 1820 cps. (at 23° C.). The precent imidization, calculated from a titration for the carboxylic acid content was 1.2±0.5%. This material was exposed to thermal treatment of 37.8° C. (100° F.) to evaluate change in kinematic viscosity with time. The measurements were made with the sample temperature at 23° C. The values over a 3 month period are shown in the following Table VI in comparison with commercially available polyimides made from the PMDA-ODA polymer. It is noted that commercially available enamels would arouse concern after about 25 days; they would be considered not fit for use in the conventional wire enameling towers at that time.

TABLE VI

Initial, intermediate and final kinematic viscosity measurements for enamels aged at 37.8° C. (100° F.) but measured at 23° C.

| | Initial* (cps) | 3 days (cps) | 27 days (cps) | 98 days (cps) | 122 days (cps) |
|---|---|---|---|---|---|
| Example 10 @ 19.0% solids | 1820 | 1060 | 1150 | 1120 | 1200 |
| Example 10 with flow agent | 1675 | 1600 | 155. | — | — |
| Type I, duPont | 2825 | 2600 | 3900 | 27,000 | 58,500 |
| Polyimide, 3M | 10,300 | 9550 | 12,200 | 29,500 | 32,800 |

*The initial viscosities are those at the time of entry into the 100° F. forced air oven. The Example 10 enamels are probably several weeks "fresher" than the commercially available enamels.

EXAMPLE 11

To a GE blender equipped with a dry nitrogen atmosphere was added a mixture of 48.7 ml. of N-methyl-2-pyrrolidone and 100 ml. of pyridine, followed by 20.8 gm. (0.105 moles) of p,p'-methylenedianiline. Then with vigorous agitation 32.2 gm. (0.100 moles) of 3,3'4,4'-benzophenonetetracarboxylic dianhydride was dded over a period of approximately five minutes. After allowing the blender to run for approximately three minutes, $NH_3$ in the form of 6.0 ml. of conc. ammonium hydroxide was added over a period of approximately one minute with continuous agitation. This was followed with addition of 93.3 ml. of distilled water. The resulting ammonium polyorthoamate polymer solution at 18.2% solids had a viscosity of about 220 cps. measured at 24° C.

A series of polyorthoamic acids and ammonium polyorthoamates was synthesized in this manner with single and dual organic solvents and with water present. This series is presented as Examples 12–22 in Table VII. Table VII illustrates the effect on shelf life of adding ammonia to form the ammonium polyorthoamate.

TABLE VII

| Example No. | Polymer raw materials | Solvent system | Solids % | Temp. (°C.) | Solution kinematic viscosity, cps., measurements at 23.5° C. | | | | | | |
|---|---|---|---|---|---|---|---|---|---|---|---|
| | | | | | 1 hr. | 24 hrs. | 4 days | 10 days | 16 days | 3 mos. | 5 mos. |
| 12 | BPDA-MDA | Pyr/water = 2/3 | 17 | 23 | 247 | 810 | gelled | — | — | — | — |
| 13 | BPDA-MDA | Pyr/water = 2/3 | 17 | 4 | 247 | 334 | 710 | gelled | — | — | — |
| 14 | BPDA-MDA-$NH_3$ ($NH_3$/COOH = 0.25/1.00) | Pyr/water = 2/3 | 17 | 23 | | | | gelled | — | — | — |
| 15 | BPDA-MDA-$NH_3$ ($NH_3$/COOH = 0.50/1.00) | Pyr/water = 2/3 | 17 | 23 | 218 | 286 | 553 | | | | 320 |
| 16 | BPDA-MDA-$NH_3$ ($NH_3$/COOH = 0.50/1.00) | Pyr/water = 2/3 | 17 | 4 | 218 | 227 | 305 | | | | 382 |
| 17 | BPDA-MDA-$NH_3$ ($NH_3$/COOH = 1.00/1.00) | Pyr/water = 2/3 | 17 | 23 | | 230 | 320 | | | | 350 |
| 18 | BPDA-MDA | NMP/Pyr/water = 1/2/2 | 17 | 23 | 250 | — | gelled | | | | |
| 19 | BPDA-MDA-$NH_3$ ($NH_3$/COOH = 0.25/1.00) | NMP/Pyr/$H_2O$ = 1/2/2 | 17 | 23 | 220 | — | — | gelled | | | |
| 20 | BPDA-MDA-$NH_3$ ($NH_3$/COOH = 0.50/1.00) | NMP/Pyr/$H_2O$ = 1/2/2 | 17 | 23 | 220 | — | — | — | — | — | 290 |
| 21 | BPDA-MDA | NMP/water = 3/1 | 22 | 23 | 99 | | | | 88 | gelled | |
| 22 | BPDA-MPA-$NH_3$ | NMP/water = 3/1 | 22 | 23 | 450 | — | 750 | — | 500 | — | 420 |

TABLE VII-continued

| Example No. | Polymer raw materials | Solvent system | Solids % | Temp. (°C.) | Solution kinematic viscosity, cps., measurements at 23.5° C. | | | | | |
|---|---|---|---|---|---|---|---|---|---|---|
| | | | | | 1 hr. | 24 hrs. | 4 days | 10 days | 16 days | 3 mos. | 5 mos. |
| | (NH$_3$/COOH = 0.50/1.00) | | | | | | | | | | |

EXAMPLE 23

A Regal mixer equipped with a cooling jacket was flushed with dry nitrogen, dewpoint −65° C. and charged with 1738 g. of dry N-methyl-2-pyrrolidone (<0.01% water), followed by 360 g. (1.818 moles), p,p'-methylene dianiline, (>99.7% purity). After stirring for about one minute, 293 g. (0.909 mole) 3,3',4,4'-benzophenonetetracarboxylic dianhydride, (>99.5% purity), was added with stirring over a period of 5 minutes and the stirring continued for 15 minutes forming the MBM precursor. The maximum temperature during this period was 35° C. The temperature was reduced to 25° C. and the precursor was further polymerized or "zipped up" by addition of 287 g. (0.891 mole) of 3,3',4,4'-benzophenonetetracarboxylic dianhydride, added slowly over a period of 15 min. with agitation, with the exotherm temperature rise controlled at a max. of 40° C., and the system eventually maintained at 25° C. After formtion of the polymer, 220 g. of conc. ammonium hydroxide was added to the Regal with mixing. This was followed by the addition of 2000 g. of distilled water and the system stirred for about 30 min. The polymer system was treated with a "flow agent-surfactant" by adding 0.6% total system weight of a conventional nonionic, nonylphenolethylene oxide adduct. The resulting enamel was employed to coat copper and aluminum wire in a conventional wire enameling tower. The coating was found to pass 25% elongation and 1-2X flexibility.

EXAMPLE 24

A Regal mixer equipped with a cooling jacket was flushed with dry nitrogen, dewpoint −65° C. and charged with 1738 g. of dry N-methyl-2-pyrrolidone (<0.01% water), followed by a mixture of 324 g. (1.636 moles) p,p'-methylene dianiline (>99.7% purity) and 36.5 g. (0.182 mole) p,p'-oxydianiline (>99.5% purity), for a total of 1.818 moles. After stirring for about one minute, 293 g. (0.909 mole) 3,3',4,4'-benzophenonetetracarboxylic dianhydride, (>99.5% purity), was added with stirring over a period of 5 minutes and the stirring continued for 15 minutes to form a precursor of the MBM type. The maximum temperature during this period was 35° C. The temperature was reduced to 25° C. and the precursor further polymerized or zipped up by the slow addition of 287 g. (0.891 mole) of 3,3',4,4'-benzophenonetetracarboxylic dianhydride, over a period of 15 min., with agitation, with the exotherm temperature rise controlled at a max. of 40° C. and the system eventually maintained at 25° C. After formation of the polymer, 220 g. of conc. ammonium hydroxide was added to the Regal mixer while mixing. This was followed by the addition of 2000 g. of distilled water and the system was stirred for about 30 min. Into the polymer system was incorporated 0.6% by total system weight of a conventional nonionic, nonylphenolethylene oxide adduct "flow agentsurfactant". The resulting enamel was employed to coat copper and aluminum wire in a conventional wire enameling tower. The coating was found to pass 25% elongation and 1-2X flexibility.

EXAMPLE 25

A Regal mixer equipped with a cooling jacket and a dry nitrogen atmosphere, was charged 2596 g. of a BMB precursor prepared in accordance with Example 1 at 29.2% solids and comprised of 1.800 moles of B and 0.900 mole of M. To this was added slowly and with stirring, over a period of 30 min., 2390 g. of an MBM precursor prepared in accordance with Example 23 at 27.3% solids and comprised of 1.818 moles of M and 0.909 mole of B. The mixing was continued for one hour, the exotherm controlled at a maximum of 45° C., and the polymer system eventually maintained at 25° C. This system was converted to the ammonium polyorthoamate according to Examples 1 and 23. The clear solution could be reduced to any solids level with water forming clear solutions.

By forming the precursor prepolymeric polyorthoamic acid materials in the initial molar ratio of two-to-one as described, I not only can control the degree of imidization, but also the purity, and the molecular weight and polydispersity as illustrated in Table I. I can further provide mixed polymers and thereby provide greater control over the properties of the polymer. By controlling the polymer molecular weight within a narrow range and by utilizing partial imidization, I not only control the properties of the materials but also I minimize reactant stack loss other than by-products of the internal condensation reaction.

From the foregoing teaching it will be seen that I have produced a distinct intermediate polymer precursor. This compound can in turn be heat treated to effect the desired level of imidization which in turn determines the degree of viscosity of the coating material. By separately heat treating the intermediate polymer precursors I can effect the desired degree of imidization without depolymerization, and a final polymeric product is obtainable with all the advantages set forth herein, including relatively higher molecular weights and lower degrees of polydispersity.

While I have emphasized the applicability of my coating process to the production of magnet wire insulation enamels, it will be appreciated that my invention is also useful in many other areas. For example, the films formed in accordance to my invention may find use in all high temperature insulation applications such as stator and rotor slot insulators, transformers, cable casings, capacitors, as well as in various laminating processes. In each case the coating composition affords a low-cost, high-class insulator or bonding agent that can be used in place of existing materials. Other potential uses of my process of forming water-borne coating solutions with or without minor modifications, will occur to those skilled in the art, and I intend, therefore, in the following claims, to cover all such equivalent variations as fall within the true spirit and scope of this invention.

What I claim as new and desire to secure by Letters Patent of the United States is:

1. A water soluble composition comprising an ammonium salt of a polyimide precursor obtained by the steps of:
   (a) forming an anhydrous mixture of 1,2,3,4 cyclopentane-tetracarboxylic dianhydride reactant and a diamine reactant in a water miscible organic solvent wherein the reactants are in the molar ratio of about two-to-one;
   (b) reacting said reactants at a temperature below that at which imidization occurs to form an amide acid intermediate having two free carboxyl groups each ortho to an amide group;
   (c) heating said intermediate at a temperature of about 90° C. or above and removing water of condensation for a period of time sufficient to partially imidize said amide acid intermediate to an imidization level greater than a negligible amount up to but not more than 56% to provide the desired viscosity of the final polyamide acid polymer solution; and
   (d) further reacting said partially imidized amide acid intermediate with a reactant of the character of the original reactant initially present in the lesser amount at a temperature below that at which imidization occurs, with said additional reactant being in a molar amount equal to the molar amount of said lesser initial reactant, the total amounts of 1,2,3,4 cyclopentane-tetracarboxylic dianhydride reactant and diamine reactant being sufficient to produce a polyimide precursor solution having a solids content of between about 25% and about 70% by weight; and
   (e) reacting said polyimide precursor solution with a volatile ammonium base to render said precursor water soluble, and diluting said solution with water.

2. The composition defined in claim 1 wherein the composition further includes a flow promoting agent.

3. The composition defined in claim 1 wherein the water miscible organic solvent has functional groups which are nonreactive with the reactants and is a solvent for at least one of said reactants.

4. The process of coating a substrate which comprises applying the composition defined in claim 1 to a substrate, and heating said coated substrate to cure said coating to the polyimide polymer form.

5. The process defined in claim 4 wherein said coated substrate is heated to a temperature of between about 100° C. and about 500° C.

6. The process of claim 5 wherein the substrate is wire.

7. A substrate coated with a cured coating of coating material produced according to the process defined in claim 1.

8. The composition defined in claim 2 wherein said flow promoting agent is selected from the group consisting of:
   (a) a nonionic, nonylphenolethylene oxide adduct surfactant in the amount of between about 0.6% and 0.7% by weight of the coating medium,
   (b) a fluorocarbon surfactant in the amount of about 100 parts per million by weight of the coating medium,
   (c) a carboxypropyl terminated dimethyl siloxane polymer flow agent in the amount of 100 parts per million by weight of the coating medium, and
   (d) a mixture of cresylic acid-phenol blend in the amount of about 6% by weight of the coating medium, and n-butyl alcohol in the amount of about 6% by weight of the coating medium.

9. The composition defined in claim 2 wherein the flow promoting agent is nonylphenoxypoly(ethyleneoxy)-ethanol in the amount of between about 0.6% and about 0.7% by weight of the composition.

10. The composition defined in claim 1 wherein the polyimide precursor is present in the composition in a concentration of between about 17% and about 22% solids by weight.

11. A water soluble composition comprising an ammonium salt of a polyimide precursor produced by the reaction steps of:
   (a) forming an anhydrous reaction mixture of 1,2,3,4 cyclopentane-tetracarboxylic dianhydride reactant and a diamine reactant in an anhydrous solvent which is substantially inert to said reactants and wherein said reactants are in the molar ratio of about two-to-one;
   (b) reacting said reactants at a temperature below about 80° C. and for a period of time sufficient to form a prepolymeric reaction product;
   (c) heating said intermediate at a temperature of about 90° C. or above and removing water of condensation for a period of time sufficient to partially imidize said prepolymeric reaction product to an imidization level greater than a negligible amount up to but not more than 56% to provide the desired viscosity of the coating medium;
   (d) reacting said partially imidized prepolymeric reaction product with a further amount of a reactant of the type of the one of said reactants which was present in the lesser amount in the reaction mixture, with said prepolymeric reaction product and said further reactant being in the molar ratio of about one-to-one, at a temperature of below about 80° C. to produce a solution of a polyimide precursor reaction product having a solids content of between about 25% and about 70% by weight;
   (e) reacting said polyimide precursor reaction product with a volatile ammonium base to render said reaction product water soluble; and
   (f) adding water to said ammoniated reaction product in an amount sufficient to form an aqueous-organic coating solution thereof having a solids content suitable for the intended coating application.

12. The composition defined in claim 11 including a cresylic acid-phenol blend flow control agent in the amount of 6% by weight of the coating medium and n-butyl alcohol in the amount of 6% by weight of the coating medium.

13. The composition defined in claim 11 including carboxypropyl terminated siloxane polymer in the amount of about 100 parts per million by weight of the coating medium.

14. The composition defined in claim 11 including a fluorocarbon surfactant in the amount of about 100 parts per million by weight.

15. In a process for producing a high solids content polyamide acid solution for use in the preparation of a coating medium for applying a curable polyamide acid coating on a substrate, which includes the steps of reacting in a solvent an amidizable tetracarboxylic compound reactant with a diamine reactant to produce a solution of a polyamide acid polymer wherein said reactants are present in approximately equal molar quantities, the improvement comprising:

(a) forming an anhydrous mixture of 1,2,3,4 cyclopentane-tetracarboxylic dianhydride reactant and a diamine reactant in an organic solvent wherein the reactants are in the molar ratio of about two-to-one;

(b) reacting said reactants at a temperature below that at which imidization occurs to form an amide acid intermediate having two free carboxyl groups each adjacent to an amide group;

(c) partially imidizing said amide acid intermediate to an imidization level greater than a negligible amount up to but not more than 56% to provide the desired viscosity of the final polyamide acid polymer solution; and (d) further reacting said amide acid intermediate with a reactant of the character of the original reactant initially present in the lesser amount with said additional reactant being in a molar amount equal to the molar amount of said lesser initial reactant;

(e) the total amounts of 1,2,3,4 cyclopentanetetracarboxylic reactant and diamine reactant being sufficient to produce a polyamide acid polymer solution having a solids content of between about 25% and about 70% by weight.

16. The process defined in claim 15 wherein said amide acid intermediate is partially imidized by heating the solution thereof to between about 90° C. and about 110° C. for a period of time sufficient to effect the desired degree of imidization.

17. The process defined in claim 15 wherein the initial reactants are in the molar ratio of two moles of diamine to one mole of tetracarboxylic compounds to form a stable amide acid intermediate material having two free carboxyl groups each adjacent to an amide group and two terminal amine groups.

18. The process defined in claim 15 wherein the improvement further comprises the steps of adding ammonia to the high solids content organic solution of said polyamide acid polymer and thereafter further diluting said organic ammonium polyorthoamate solution with water to form a stable aqueous-organic coating medium having a solids content suitable for the intended coating application.

19. The process defined in claim 18 wherein the improvement further comprises the step of adding a flow promoting agent to the aqueous-organic coating medium.

20. The process in accordance with claim 15 in which said diamine is selected from the group consisting of 1,3-bis-delta-amino butyltetramethyl disiloxane and 2,4,6-triamino-1,3,5-triazine and mixtures thereof.

21. The process in accordance with claim 15 wherein the reaction is carried out within an anhydrous organic solvent, said solvent having functional groups which are nonreactive with the reactants and being a solvent for at least one of said reactants.

22. The process of coating a substrate which comprises applying the polyamide acid produced according to the process defined in claim 15 to a wire substrate, and heating said coated substrate to cure said coating to the polyimide polymer form.

23. The process defined in claim 22 wherein said coated substrate is heated to a temperature of between about 100° C. and about 500° C.

24. A substrate coated with a cured coating of coating material produced according to the process defined in claim 15.

25. A process for coating a substrate with a polyamide acid coating comprising the steps of:

(a) forming an anhydrous reaction mixture of 1,2,3,4 cyclopentane-tetracarboxylic dianhydride reactant and a diamine reactant in an anhydrous solvent which is substantially inert to said reactants and wherein said reactants are in the molar ratio of about two-to-one;

(b) reacting said reactants at a temperature below about 80° C. and for a period of time sufficient to form a prepolymeric reaction product;

(c) partially imidizing said prepolymeric reaction product to an imidization level greater than a negligible amount up to but not more that 56% to provide the desired viscosity of the polyamide acid coating medium;

(d) reacting said prepolymeric reaction product with a further amount of a reactant of the type of the one of said reactants which was present in the lesser amount in the reaction mixture, with said prepolymeric reaction product and said further reactant being in the molar ratio of about one-on-one, at a temperature of below about 80° C. to produce a solution of a polyamide acid reaction product having a solids content of between about 25% and about 70% by weight;

(e) reacting said polyamide acid reaction product with a volatile ammonium base to render said reaction product water soluble;

(f) adding water to said ammoniated reaction product in an amount sufficient to form an aqueous-organic solution thereof having a solids content suitable for the intended coating application;

(g) adding to said aqueous-organic solution a flow control agent to form a coating medium; and (h) applying a coating of said coating medium to the substrate.

26. The coating process defined in claim 25 wherein said flow promoting agent is selected from the group consisting of:

(a) a nonionic, nonylphenolethylene oxide adduct surfactant in the amount of between about 0.6% and about 0.7% by weight of the coating medium, (b) a fluorocarbon surfactant in the amount of about 100 parts per million by weight of the coating medium, (c) a carboxypropyl terminated dimethyl siloxane polymer flow agent in the amount of 100 parts per million by weight of the coating medium, and (d) a mixture of cresylic acid-phenol blend in the amount of about 6% by weight of the coating medium, and n-butyl alcohol in the amount of about 6% by weight of the coating medium.

27. The coating process defined in claim 25 wherein the flow promoting agent is nonylphenoxypoly(ethyleneoxy)-ethanol in the amount of between about 0.6% and about 0.7% by weight of the coating medium.

28. The coating process defined in claim 25 wherein the polyamide acid reaction product is present in the coating medium in a concentration of between about 17% and about 22% solids by weight.

29. The coating process defined in claim 25 including the step of heating the coated substrate to a temperature and for a time sufficient to effect imidization of the polyamide acid coating.

30. The coating process defined in claim 29 wherein said temperature is between about 100° C. and about 500° C.

31. The coating process defined in claim 25 wherein the reaction temperature in steps (b) and (d) is below about 50° C.

32. The coating process defined in claim 25 wherein the maximum reaction temperature in step (b) is about 35° C. and the reaction temperature in step (d) is maintained between about 25° C. and about 45° C.

33. The coating process defined in claim 25 wherein said partial imidization is effected by heating said prepolymeric reaction product to a temperature between about 90° C. and about 110° C. for a period of time sufficient to produce the desired level of imidization.

34. A stable amide acid intermediate composition for use in preparing a high solids current polyamide acid coating composition, comprising the reaction product of a diamine reactant and 1,2,3,4 cyclopentane-tetracarboxylic dianhydride reactant in an anhydrous organic solvent, wherein the reactants are in the molar ratio of about two moles of one reactant to about one mole of the other and wherein said product is partially imidized to a level greater than a negligible amount up to but not more than 56% to provide the desired viscosity of the high solids content polyamide acid coating composition.

35. The intermediate composition defined in claim 34 wherein the initial reactants are in the molar ratio of two moles of diamine to one mole of 1,2,3,4 cyclopentane-tetracarboxylic dianhydride to form a stable amide acid intermediate material having two free carboxyl groups each ortho to an amide group, and two terminal amine groups.

* * * * *